United States Patent [19]

Ash

[11] Patent Number: 4,749,127
[45] Date of Patent: Jun. 7, 1988

[54] TELESCOPING SNOW MAKING APPARATUS AND METHOD FOR USING SAME

[76] Inventor: Robert M. Ash, 401 Crabbery La., Raleigh, N.C. 27609

[21] Appl. No.: 14,595

[22] Filed: Feb. 13, 1987

[51] Int. Cl.⁴ .............................................. A01G 15/00
[52] U.S. Cl. .................................... 239/14.2; 239/204
[58] Field of Search .................... 239/2.2, 14.2, 200, 239/201, 203–206

[56] References Cited

U.S. PATENT DOCUMENTS

| | | | |
|---|---|---|---|
| 1,484,888 | 2/1924 | Johnson | 239/204 |
| 1,906,621 | 5/1933 | Knatt | 239/204 |
| 1,958,385 | 5/1934 | Sweetland | 239/204 |
| 2,595,598 | 5/1952 | Morton | 239/204 |
| 3,331,292 | 6/1966 | Seablom | 239/204 X |
| 3,706,414 | 12/1972 | Dupre | 239/14.2 |
| 4,010,901 | 3/1977 | Sheets | 239/204 |
| 4,466,142 | 8/1984 | Gould | 239/204 X |

Primary Examiner—Andres Kashnikow
Assistant Examiner—Kevin Patrick Weldon
Attorney, Agent, or Firm—Jennings, Carter, Thompson & Veal

[57] ABSTRACT

Apparatus for making snow using pressurized water and air wherein a housing is implanted into the earth at a selected location on a ski slope and connected to underground lines for supplying water and air thereto. An elongated extendable bichamberal spray head is slidingly mounted within the housing such that the introduction of pressurized air to the outer chamber of bichamberal spray head via the housing causes the spray head to rise to a predetermined elevation. Introduction of water to inner chamber of the spray head generates snow when the pressurized water is discharged to the atmosphere through the pressurized air. The spray head is stored within the housing when not in use to eliminate any hazard to skiers and the labor required to utilize a portable snowgun.

9 Claims, 2 Drawing Sheets

TELESCOPING SNOW MAKING APPARATUS AND METHOD FOR USING SAME

FIELD OF THE INVENTION

The present invention relates generally to the field of artificial snow making and particularly to an apparatus for making snow in situ at selected locations on the ski slopes. More particularly, the present invention may be described as a pneumatically extendable snow making apparatus which is housed in a subterranean storage position and supplied with air and water for snow making through underground conduits.

BACKGROUND OF THE INVENTION

In my earlier U.S. Pat. No. 4,194,689, I disclosed a method and apparatus for producing snow from pressurized water and air wherein a stream of water was discharged into the atmosphere in the axial center of a column of air flowing through a discharge orifice. The apparatus was portable and was supplied with air and water via hoses from remote sources. Ski slope operators could position the snowmakers wherever they were needed, however this flexibility in positioning required manpower to position, operate, and remove the snowguns and the associated hoses.

In my U.S. Pat. No. 4,465,230, I improved upon the snowgun such that substantially all of the water particles are encased within a sheath of laminar flow air as it moves through the discharge chamber. This improvement did nothing to eliminate or reduce the manpower required to position, operate, and remove the system.

I am aware of other patented snowmaking apparatus as disclosed in U.S. Pat. Nos. 3,494,559, 3,761,020, 3,892,013, 3,897,904 and 4,275,833. Each of the above can be used as portable devices for making snow, however, they constitute an unnecessary hazard to skiers if they are not removed from the slopes.

SUMMARY OF THE INVENTION

It is an object of the present invention to provide an efficient economical snow making apparatus that can be permanently, yet safely, positioned at a selected area of a ski slope and activated remotely to make snow as required.

Another object of the invention is to provide a permanently installed snowgun which does not constitute a hazard to skiers.

Still another object of the invention is to provide a snowgun which can be operated with minimal expenditure of labor.

These and other objects and advantages are obtained with my invention through the use of an extendable discharge head which rises to an elevation above the ground to discharge pressurized air and water to make snow. The head is stored in an underground housing until snow is required whereupon pressurized air is introduced into the housing beneath the head, which forms a sliding seal with the housing such that the pressurized air is directed through an outer chamber, formed by the head, to one or more discharge apertures. The force of the air within the housing displaces the head, whereupon pressurized water is introduced to an inner chamber which has a plurality of discharge ports aligned with the discharge apertures such that the pressurized water and air are discharged from the head with the air surrounding the stream of water as taught in my earlier patents.

BRIEF DESCRIPTION OF THE DRAWINGS

Apparatus embodying features of my invention are depicted in the appended drawings which form a portion of this application and wherein.

DESCRIPTION OF A PREFERRED EMBODIMENT

Figure 1:
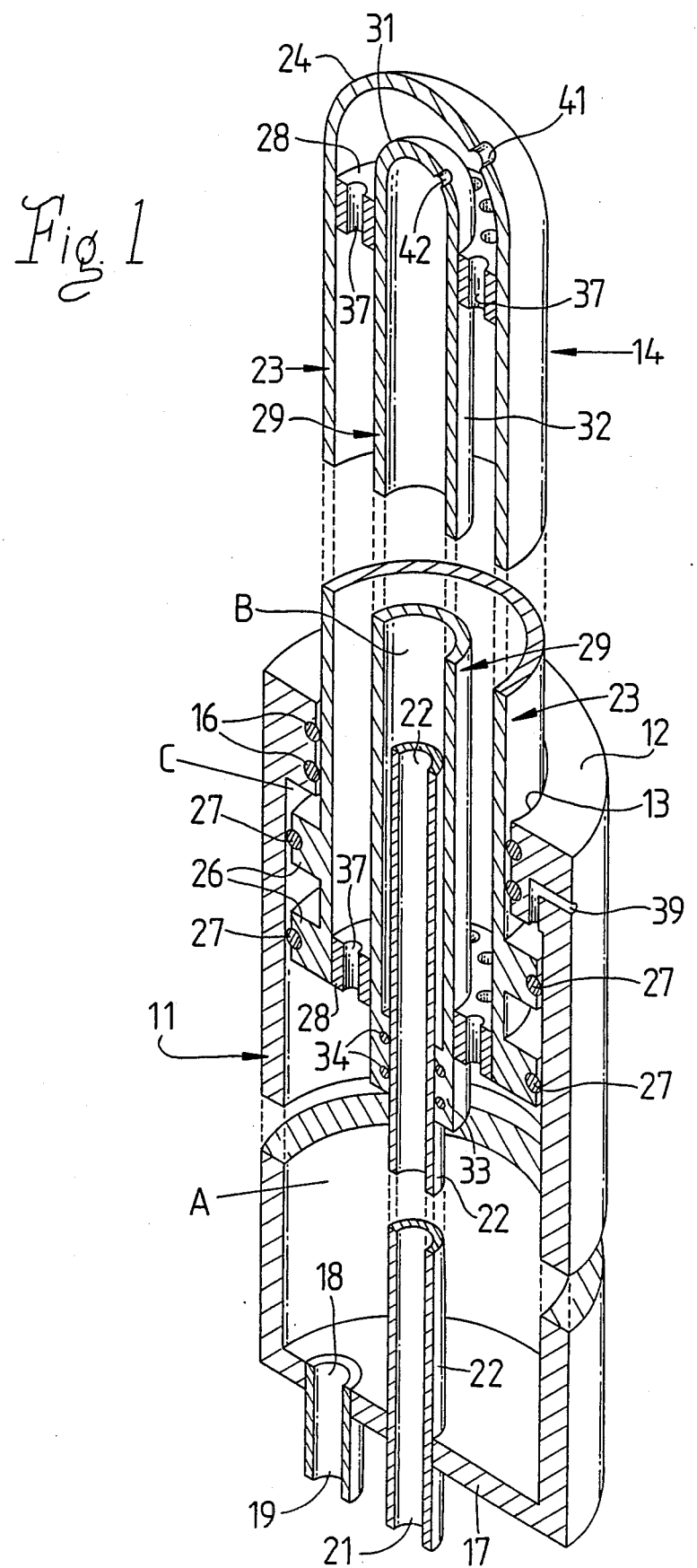
FIG. 1 is perspective sectional view taken along the vertical centerline of the apparatus.

Referring to FIG. 1, it may be seen that my invention is designed for implantation in the ground on a ski slope in an area where artificial snow is frequently needed. A housing 11 extends downwardly into the earth a predetermined distance, for example 6' to 25'. The housing 11 has a top 12 which has a central aperture 13 through which an elongated spray head 14 extends. A set of ring-like seals 16 are positioned in the top 12 about the aperture 13 to provide a substantially fluid-tight sliding seal between the housing 11 and the spray head 14. The housing 11 has a sealed bottom 17 with an inlet port 18 therein for receiving pressurized air from a remote source, through an air line 19.

Pressurized water is also supplied to the interior of the housing from a remote source through water line 21 which terminates in a stand pipe 22 affixed coaxially within the housing 11. The stand pipe 22 is substantially the same length as the housing 11 and is made from a suitable rigid material.

The spray head 14 is formed by an outer shell 23 which is essentially an elongated cylinder which terminates in a curved top portion 24. Top portion 24 is preferentially parabolically curved to facilitate upward movement through a light overburden of snow, yet to avoid having an angular protusion above the housing 11. The outer shell 23 fits within the aperture 13 forming a sliding seal with the rings 16. Distal the top portion 24 and carried by the outer shell 23 are annular guide members 26. The annular guide members 26 extend outwardly from the outer shell 23 and carry a plurality of ring seals 27 which form an annular sliding seal between the guide member 26 and the interior of the housing 11.

Mounted coaxially with the outer shell 23 and spaced therefrom by a set of web-like spacers 28 is an inner shell 29. Inner shell 29 has a top portion 31, the curvature of which matches that of top portion 24, and an elongated tubular portion 32 which extends downwardly within the housing 11 about the stand pipe 22. An internal guide flange 33 carries a set of ring seals 34 which form an annular sliding seal between the inner shell 29 and the stand pipe 22. It may thus be seen that three separate chambers are formed by the plurality of sealing elements. Chamber A is formed below the spray head 14 by seals 27 and 34; chamber B is formed within the inner shell 23 by rings 34; and chamber C is formed above the annular guide member by rings 16 and 27. Chamber A communicates only with the air line 19 and receives pressurized air. This air passes into the cavity between inner shell 29 and outer shell 23 via apertures 37 in the spacers 28. Chamber B communicates only with the water line 21 through stand pipe 22. Chamber C communicates with an auxiliary air line 39. Each top portion 24 and 31 have at least one orifice 41 and 42, respectively, formed therein for discharging the pressurized fluid contained within the spray head 14. Each orifice 41 in the outer shell 23 has an associated orifice 42 in the inner shell 31, with the orifices aligned such that water discharged through orifice 42 exits the spray head 14 through the center of orifice 41.

Figure 2:
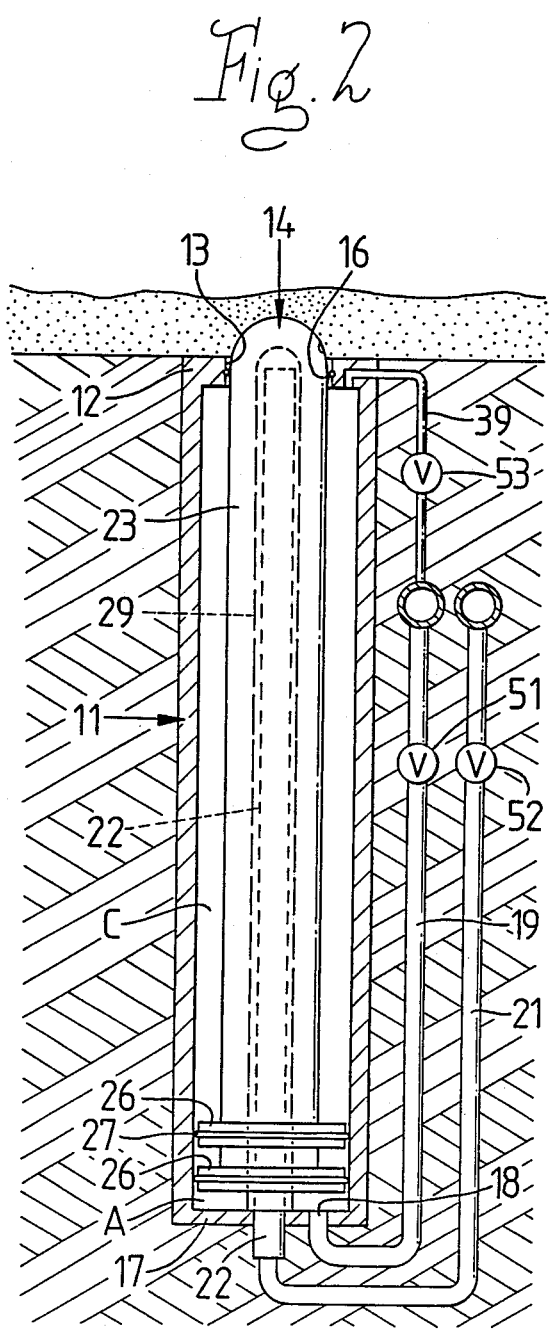
FIG. 2 is an elevational view partially in section of the apparatus in its retracted position.

Referring to FIG. 2 wherein the apparatus is shown in its inoperative position, it may be seen that the spray head 14 is positioned approximately at ground level such that it does not constitute an obstacle or hazard to skiers. Likewise, the air and water lines 19 and 21 are buried beneath the surface and present no obstacle to skiers. The air line 19 and water line 21 each have a remotely controlled valve, 51 and 52 respectively, by which the flow of fluid may be controlled, a third valve 53 controls air flow through the auxiliary air line.

Figure 3:
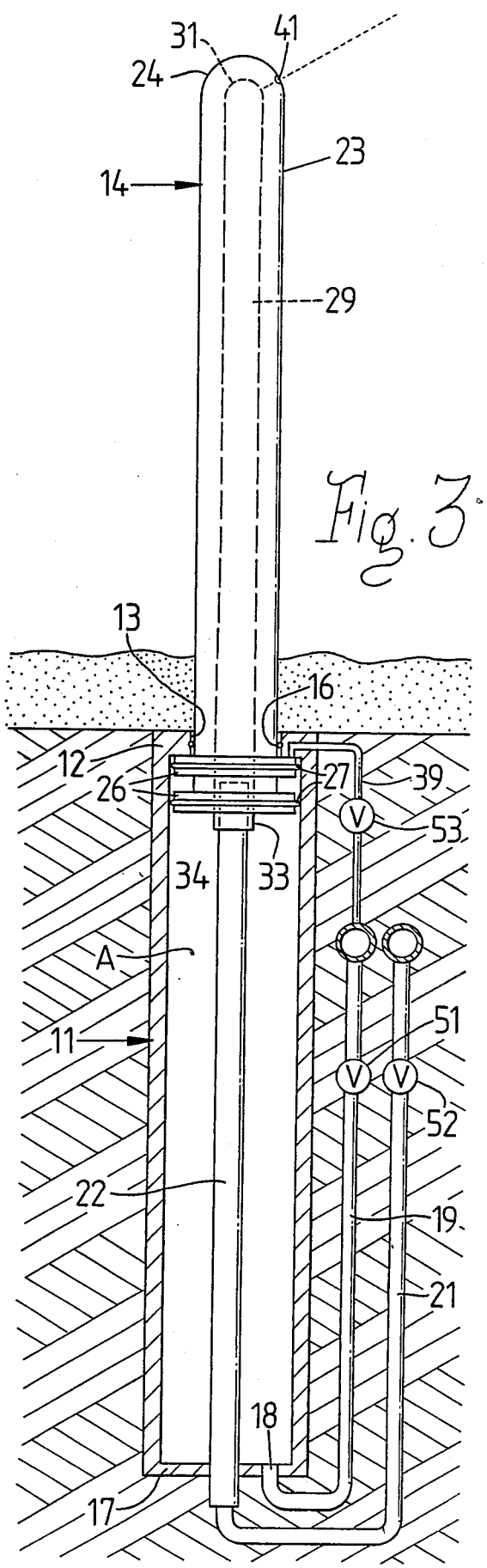
FIG. 3 is an elevational view showing the spray head in its extended position.

In operation, valve 51 is opened by remote control to allow pressurized air to flow through the air line 19 to chamber A. Although the air can exit through the orifice 41, the orifice 41 is sufficiently restrictive to retain adequate air pressure within the chamber A to urge the spray head 14 upwards to the position shown in FIG. 3. Conventional snow making operations have the capacity to generate air pressurized to around 150 psi which is more than adequate to raise the spray head 14 which may be made of a suitable lightweight material. It should be noted that the spray head 14 is raised by pressurized air prior to the introduction of water to the spray head 14. Prematurely opening valve 52 would allow water to exit chamber B with insufficient air to create snow and would therefore discharge water onto the ground where it would be likely to freeze as ice, which, of course, is undesirable on a ski slope.

When the spray head 14 is raised to an operative position, valve 52 is opened and pressurized water is admitted to chamber B via water line 21. The pressurized water exits chamber B through orifice 42 in a stream directed through the center of orifice 41 to produce snow in the manner taught by my earlier U.S. patents. While I have shown only one set of apertures 41 and 42 it will be appreciated that the number of apertures may be varied according to the capabilities and requirements of the snow making system; however, in the preferred embodiment, the housing 11 has a diameter of 3" to 10", thus the number of apertures in the spray head 14 will be limited by virtue of the size thereof. It is also note-worthy to mention that the spray head 14 may be rotated about its vertical axis to direct the snow making spray of air and water in any desired direction, thus a relatively large area may be serviced by a single spray head 14.

When an adequate amount of snow has been produced, valve 52 is closed to stop the flow of water and thereafter valve 51 is closed to stop the flow of pressurized air to chamber A. Valve 53 is opened to introduce pressurized air into chamber C above the annular guides 26 thus forcing the spray head 14 to return to its storage position within housing 11.

While I have shown my invention in one form, it will be obvious to those skilled in the art that it is not so limited but is susceptible of various changes and modifications without departing from the spirit thereof.

What I claim is:

1. Apparatus for making snow utilizing pressureized water and air obtained from remote sources comprising an elongated housing extending from about ground level downward to a predetermined depth, an elongated spray head having a curved top portion, a bifucated inner chamber for receiving pressureized air and water, and at least one discharge aperture, with said spray head being slidably mounted within said housing such that said spray head extends from said housing to a predetermined height responsive to the introduction of pressurized air into said chamber, with said spray head including an outer shell substantially cylindrical in shape, terminating in said curved top portion, and mounted in sliding engagement with said housing, and an inner shell coaxial with said outer shell and having a curved upper portion with said inner shell maintained in fixed spacial relation to said outer shell such that an outer cavity is formed therebetween in communication with said pressurized air source, and with said inner shell forming an inner chamber in communication with said source of pressurized water, and with said inner shell and outer shell having an equal number of aligned aperatures therethrough for concomitantly discharging pressurized air and water from said inner chamber and outer cavity.

2. Apparatus as defined in claim 1 wherein said top portion is parabolically curved to facilitate passage of said spray head through an overburden of snow.

3. Apparatus as defined in claim 1 further comprising an upstanding water delivery tube mounted within said housing and coaxial with said spray head for delivery of pressurized water to within said inner shell.

4. Apparatus as defined in claim 3 further comprising seal means intermediate said water delivery tube and said inner shell for maintaining a substantially watertight seal therebetween as said spray head moves within said housing.

5. Apparatus as defined in claim 1 further comprising a plurality of annular guides carried by said outer shell proximal the lowermost end thereof and forming a sliding annular seal between said spray head and said housing.

6. Apparatus as defined in claim 5 wherein said outer cavity communicates with the interior of said housing beneath said annular guides and wherein an inlet to said housing for said pressurized air is provided such that said pressurized air enters said housing beneath said annular guides.

7. Apparatus as defined in claim 6 further comprising an upstanding water delivery tube mounted within said housing and coaxial with said spray head for delivery of pressurized water to within said inner shell.

8. Apparatus as defined in claim 6 further comprising means for introducing pressurized air to said housing above said annular seal for forcing said spray head back into said housing.

9. Apparatus as definged in claim 1 further comprising means for selectively controlling the flow of said air and water to said spray head.

* * * * *